No. 784,940. PATENTED MAR. 14, 1905.
T. G. HARRIS.
STOCK FEEDER.
APPLICATION FILED JULY 25, 1904.
2 SHEETS—SHEET 1.
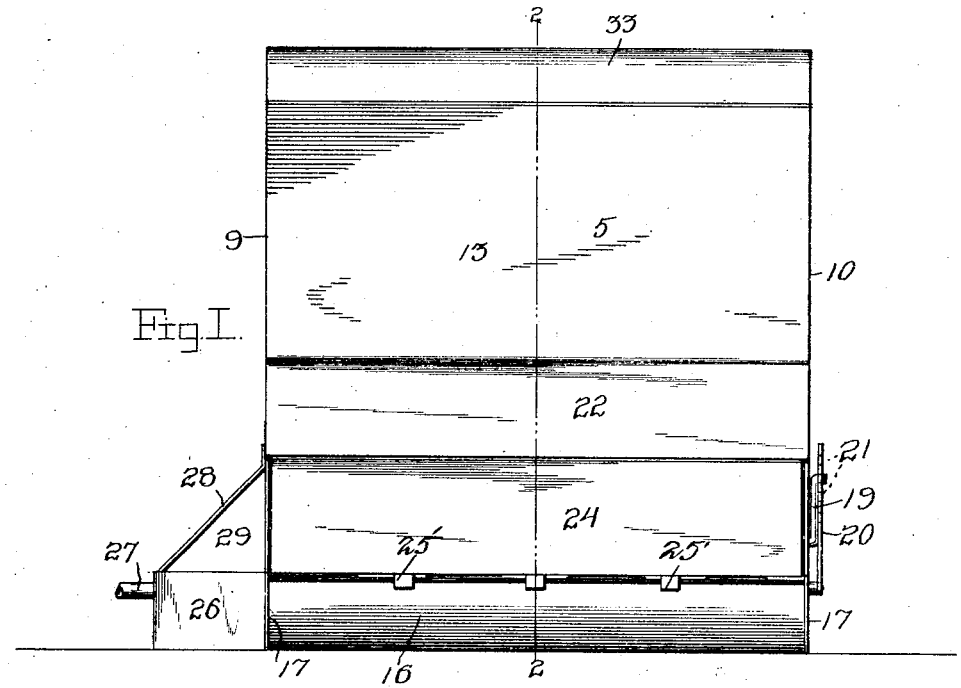
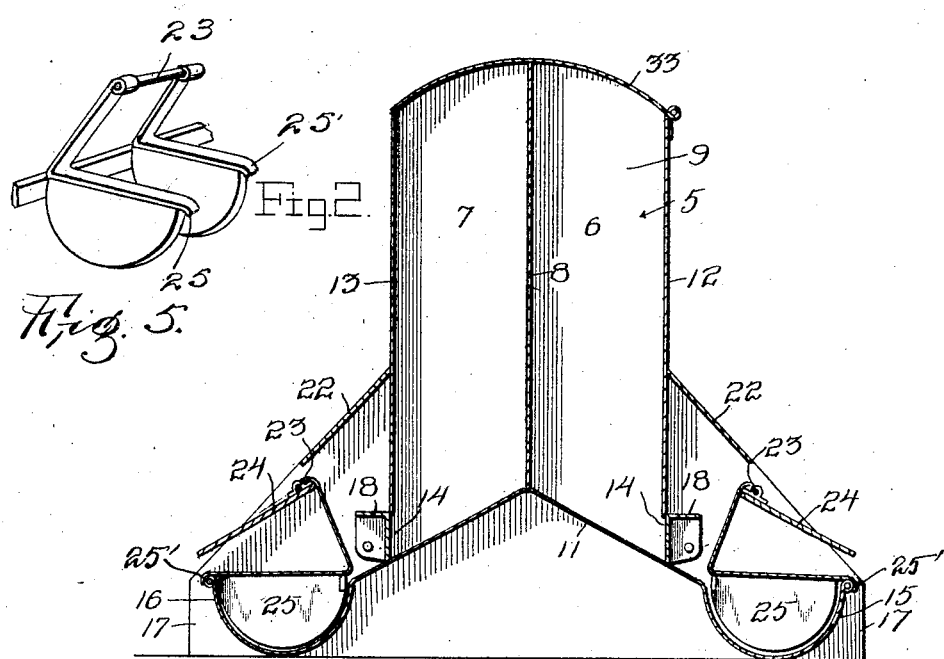

No. 784,940. PATENTED MAR. 14, 1905.
T. G. HARRIS.
STOCK FEEDER.
APPLICATION FILED JULY 25, 1904.
2 SHEETS—SHEET 2.
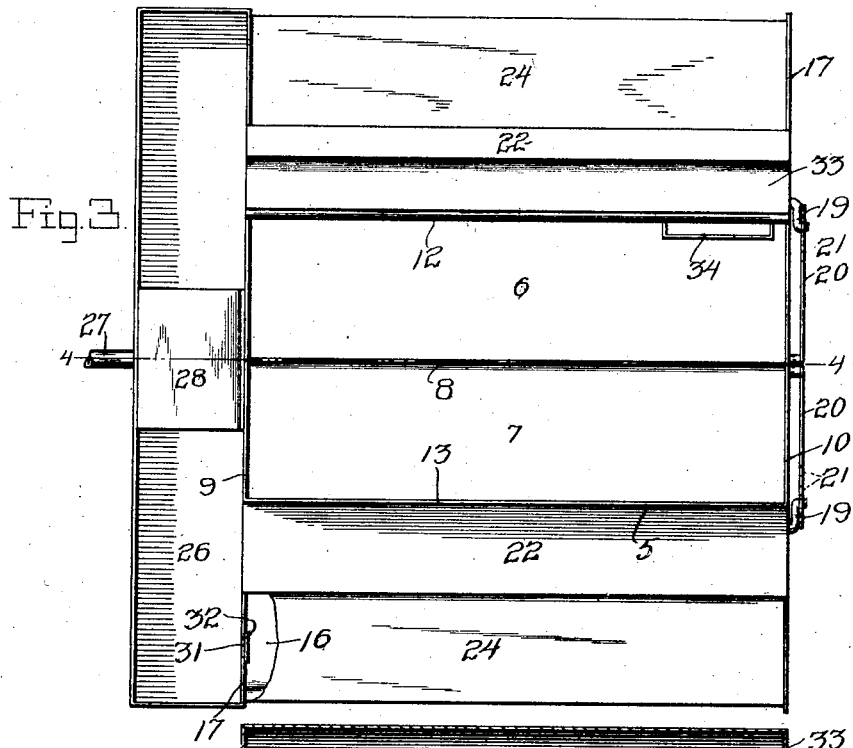
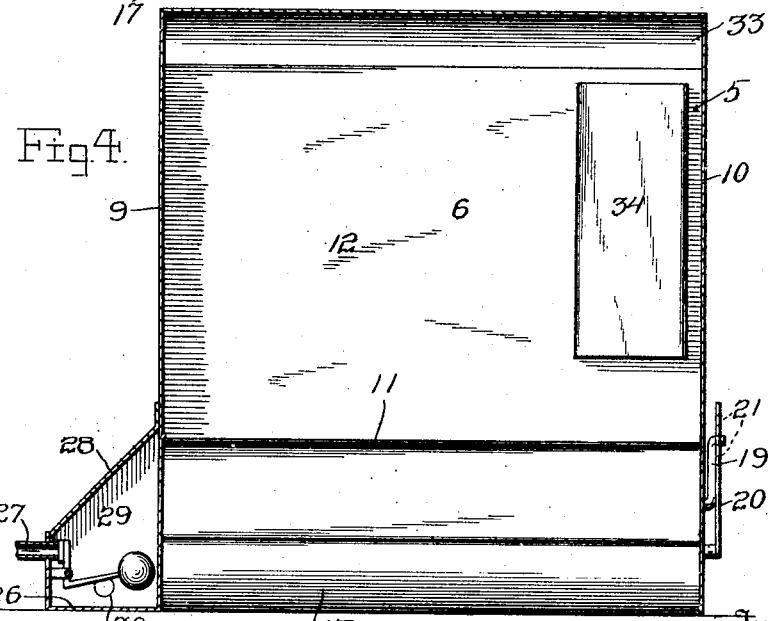

No. 784,940. Patented March 14, 1905.

UNITED STATES PATENT OFFICE.

THEODORE G. HARRIS, OF HELENA, OKLAHOMA TERRITORY.

STOCK-FEEDER.

SPECIFICATION forming part of Letters Patent No. 784,940, dated March 14, 1905.

Application filed July 25, 1904. Serial No. 218,079.

*To all whom it may concern:*

Be it known that I, THEODORE G. HARRIS, a citizen of the United States, residing at Helena, in the county of Woods, Oklahoma Territory, have invented certain new and useful Improvements in Stock-Feeders; and I do hereby declare the following to be a full, clear, and exact description of the invention, such as will enable others skilled in the art to which it appertains to make and use the same.

This invention relates to stock-feeders, and has for its object to provide a feeder with which stock in different inclosures may be fed and in which the food supplied to the stock may be soaked or supplied dry, as desired, means being provided to prevent the stock from reaching the food while it is soaking.

A further object is to provide a feeder so arranged that food may be stored therewithin and supplied to the stock in any desired quantity.

Other objects and advantages may be apparent from the following description, and it will be understood that modifications of the specific construction shown may be made and any suitable materials may be used without departing from the spirit of the invention.

In the drawings forming a portion of this specification, and in which like numerals of reference indicate similar parts in the several views, Figure 1 is a side elevation of the feeder. Fig. 2 is a section on line 2 2 of Fig. 1. Fig. 3 is a top plan view with the lid raised. Fig. 4 is a section on line 4 4 of Fig. 3. Fig. 5 is a detail perspective view showing the arrangement of the partitions.

Referring now to the drawings, the present invention comprises a receptacle 5, divided longitudinally into two compartments 6 and 7 by means of a central partition 8, which is secured to the end walls 9 and 10 of the receptacle. From the partition 8 the bottom 11 of the receptacle slants downwardly toward the side walls 12 and 13 of the receptacle, and these walls are spaced vertically from the bottom to form passages 14, through which food placed within the compartments 6 and 7 may pass to troughs 15 and 16, which are disposed outwardly of the receptacle. These troughs are in reality continuations of the bottom 11, which extends outwardly beneath the walls 12 and 13, where it is curved first downwardly, then upwardly, to form the troughs, the ends of the troughs being formed by extensions 17 of the end walls 9 and 10. Doors 18 are pivoted at their ends between the extensions 17 and have cranks 19 at one end, lying exteriorly of the extensions and by means of which they may be moved to vary the size of the passages 14 to permit of lesser or greater amount of food to pass therethrough to the troughs. Secured to the end of the feeder between and below the cranks 19 are perforated plates 20, which are arranged for engagement of the cranks with their perforations 21 interchangeably to hold the cranks with the doors at different points of their movement.

Extending outwardly from the sides 12 and 13 and covering a portion of the troughs 15 and 16 are plates 22, which are secured at their ends to the extensions 17, and below the outer edges of each of these plates there is mounted between the extensions a shaft 23, upon which are hinged closures 24 for the opened portions of the troughs.

Disposed within each of the troughs 15 and 16 are a plurality of transverse partitions 25, which are connected with each other and which are hinged to the shaft 23 for movement upwardly out of the troughs to permit of cleaning of the latter. These partitions have tabs 25', which are arranged to engage over the edges of the troughs 15 and 16, as shown in Fig. 1.

Secured to the outer face of the end 9, adjacent to the lower edge thereof, is a water-trough 26, having a supply-pipe 27 communicating therewith, which is fitted with a float-valve, and secured to the edge of the trough 26 and to the outer face of the end 9 is a plate 28, which lies above the float-valve, thus preventing animals from getting into the trough and injuring the valve mechanism, and within the trough, at either side of the plate 28, is a partition 29, having an opening 30 therethrough for the passage of water, the object of these partitions being to prevent animals from getting into the trough, and it is for a similar purpose that the partitions 25 in the troughs 15 and 16 are provided, as will be readily understood. Passages 31 are formed through the extensions 17 at the end 9 and communicate with the troughs 15 and 16 and the trough 26, and these openings are fitted with valves 32.

When it is desired to feed soaked food to the stock, the desired amount of food is permitted to pass in the troughs 15 and 16, and the valves 32 are opened to permit water to pass therethrough, it being understood that the closures 24 are lowered to prevent the stock from eating the food while it is soaking. When it is desired to feed dry food to the stock, it is only necessary to permit the food to pass to the troughs 15 and 16 without opening the valves 32. To permit the stock to reach the food, the closures 24 of course are raised.

A lid 33 is provided for the receptacle 5, and within one of the compartments of the receptacle there is disposed a supplemental receptacle 34, designed to contain condition-powders or other medicinal preparations which it is customary to place in the food.

The plates 22 and the closures 24 slant downwardly, as shown, so that rain falling thereon will drain off to the ground without entering the troughs 15 and 16.

As mentioned above, the feeder may be used to supply food to animals in different inclosures, and in this case the feeder is disposed in the division-fence with one of the troughs 15 and 16 and a portion of the trough 26 extending into each inclosure.

What is claimed is—

1. A stock-feeder comprising a food-receptacle, troughs communicating with the receptacle and arranged for the reception of food therefrom, means for regulating the passage of food from the receptacle to the troughs, a water-trough communicating with the first-named troughs for the passage of water thereto, and closures for the first-named troughs, said closures being movable into and out of operative position.

2. A stock-feeder comprising a food-receptacle, troughs communicating with the receptacle and arranged for the reception of food therefrom, plates secured to the receptacle and extending over portions of the troughs, shafts secured at their ends to the ends of the troughs and lying beneath the plates, closures for the troughs hinged to the shafts for movement into and out of operative position, a plurality of transverse partitions disposed within each of the troughs and hinged to the shafts for movement upwardly out of the troughs to permit of cleaning of the latter, and a closure for the receptacle.

3. A stock-feeder comprising a receptacle including vertical side and end walls, and a bottom, and a partition disposed within the receptacle to form food-receiving compartments, said partition resting against the bottom at its lower edge, said bottom slanting downwardly from the partition and outwardly beyond the opposite side walls of the receptacle and spaced from the lower edge thereof, said bottom being curved downwardly beyond the walls and then outwardly to form troughs, the end walls of the receptacle having extensions at opposite sides secured to the end edges of the outwardly-extending portions to form the ends of the troughs.

4. A stock-feeder comprising a food-receptacle, troughs communicating with the receptacle and arranged for the reception of food therefrom, a water-trough communicating with the first-named troughs and having an opening communicating with a water-supply, a valve for the opening, and a plate secured to the trough and to the receptacle and lying above the valve to form a guard therefor.

In testimony whereof I affix my signature in presence of two witnesses.

THEODORE G. HARRIS.

Witnesses:
M. W. DENNINGER,
F. W. BULL.